United States Patent
Tipke (10) Patent No.: US 10,742,583 B2
(45) Date of Patent: Aug. 11, 2020

(54) SHARED COMMAND HISTORY

(71) Applicant: Microsoft Technology Licensing, LLC, Redmond, WA (US)

(72) Inventor: Joel Tipke, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 351 days.

(21) Appl. No.: 15/445,562

(22) Filed: Feb. 28, 2017

(65) Prior Publication Data
US 2018/0248828 A1    Aug. 30, 2018

(51) Int. Cl.
*H04L 12/58*   (2006.01)
*H04L 29/08*   (2006.01)
*G06F 9/455*   (2018.01)

(52) U.S. Cl.
CPC .......... *H04L 51/18* (2013.01); *G06F 9/45512* (2013.01); *H04L 51/16* (2013.01); *H04L 67/1095* (2013.01)

(58) Field of Classification Search
CPC ......... H04L 51/18; H04L 67/10; H04L 51/16; H04L 67/1095; G06F 9/45512
See application file for complete search history.

(56) References Cited

U.S. PATENT DOCUMENTS

| | | | |
|---|---|---|---|
| 7,099,798 B2 | 8/2006 | Yu et al. | |
| 8,079,019 B2 | 12/2011 | Lindo et al. | |
| 8,935,673 B1 * | 1/2015 | Ashkenazi | G06F 11/3636 702/186 |
| 9,246,768 B2 | 1/2016 | White et al. | |
| 9,335,894 B1 | 5/2016 | Khafizov et al. | |
| 9,817,890 B2 * | 11/2017 | Acuna | G06F 17/276 |
| 2006/0090167 A1 * | 4/2006 | Keohane | G06F 9/45512 719/319 |
| 2008/0320151 A1 * | 12/2008 | McCanne | H03M 7/30 709/228 |
| 2009/0157884 A1 * | 6/2009 | Anderson | G06F 15/16 709/228 |
| 2009/0320137 A1 * | 12/2009 | White | G09B 19/0053 726/25 |
| 2013/0085747 A1 * | 4/2013 | Li | G06F 40/242 704/10 |

(Continued)

OTHER PUBLICATIONS

"History Command", https://web.archive.org/web/20081202171324/http://msdn.microsoft.com/en-us/library/yxtbh4yh(VS.80).aspx, Published on: Dec. 2, 2008, 3 pages.

(Continued)

*Primary Examiner* — Arvin Eskandarnia
*Assistant Examiner* — Chhian (Amy) Ling (57) ABSTRACT

Aspects of the present disclosure relate to systems and methods for providing a shared command history. In one aspect, a shared command history is enabled for performing at least one process using a command line interface. One or more commands entered in the command line interface may be sent to a shared storage location. One or more commands stored in the shared storage location and executed using at least another command line interface may be received. The shared command history may be displayed in the command line interface. In one example, the shared command history includes at least the one or more received commands.

20 Claims, 6 Drawing Sheets

(56) References Cited

U.S. PATENT DOCUMENTS

| | | | | |
|---|---|---|---|---|
| 2013/0301071 | A1* | 11/2013 | Kikuchi | G06F 3/1204 358/1.13 |
| 2014/0096066 | A1* | 4/2014 | Auvenshine | G06F 9/45512 715/780 |
| 2014/0372902 | A1* | 12/2014 | Bryant | G06Q 30/0259 715/748 |
| 2015/0358392 | A1* | 12/2015 | Ramalingam | G06F 16/972 709/203 |
| 2017/0060665 | A1* | 3/2017 | Wang | H04L 41/00 |
| 2018/0189189 | A1* | 7/2018 | Jain | G06F 11/16 |

OTHER PUBLICATIONS

"Command History", https://in.mathworks.com/help/matlab/matlab_env/command-history.html?requestedDomain=www.mathworks.com, Retrieved on: Jan. 17, 2017, 3 pages.

"Preserve bash history in multiple terminal windows", https://web.archive.org/web/20150909145830/http:/unix.stackexchange.com/questions/1288/preserve-bash-history-in-multiple-terminal-windows, Published on: Sep. 9, 2015, 7 pages.

"History or log of commands executed in Git", https://web.archive.org/web/20130306063546/http:/stackoverflow.com/questions/7435452/history-or-log-of-commands-executed-in-git, Published on: Mar. 6, 2013, 2 pages.

Simpson, Blaine, "Sql Tool", http://hsqldb.org/doc/2.0/util-guide/sqltool-chapt.html, Published on: May 15, 2016, 50 pages.

"Load or Save or Display the Commands History", https://stat.ethz.ch/R-manual/R-devel/library/utils/html/savehistory.html, Retrieved on: Jan. 17, 2017, 2 pages.

Roth, Corey, "Useful tips for Command Prompt and PowerShell Noobs", http://www.dotnetmafia.com/blogs/dotnettipoftheday/archive/2010/09/23/useful-tips-for-command-prompt-and-powershell-noobs.aspx, Published on: Sep. 23, 2010, 5 pages.

* cited by examiner

FIG. 1

```
Command Prompt                                    [_][□][X]

Version 1.00.1.0
C:\start\teamcommand      ⌢ 212
C:\users\v-joelt > dir doc*

Directory of C:\users\v-joelt

12/02/2017 12:46 PM  <DIR>   Documents
                0 File(s)       0 bytes
                1 Dir(s)  10,564,276 bytes free C:\users\v-joelt > cd \

C:\ > dir win*

Directory of C:\

12/09/2017 12:46 PM  <DIR>   Documents
                0 File(s)       0 bytes
                1 Dir(s)  10,564,276 bytes free C:\ > notepad newfile.txt

```
Command Prompt                                    [_][□][X]

C:\Start\teamcommand  ~ 212
C:\users\v-joelt > dir doc*            ┌─────────────────┬──────────────────────────────┐
Directory of C:\users\v-joelt          │   My History    │       Shared History     230 │
12/02/2017 12:46 PM <DIR>  Documents   ├─────────────────┼──────────────────────────────┤
        0 File(s)      0 bytes         │ 0: dir doc*     │ 0: cd \                      │
        1 Dir(s)  10,564,276 bytes free│ 1: cd \         │ 1: mkdir teamdir             │
                                       │ 2: dir win*     │ 2: cd teamdir                │
C:\users\v-joelt > cd \                │ 3: notepad      │ 3: dir c:\temp > results.txt │
                                       │    newfile.txt  │                              │
C:\ > dir win*                         └─────────────────┴──────────────────────────────┘
                                                    220
Directory of C:\

12/09/2017 12:46 PM <DIR>  Documents          ← 210
        0 File(s)      0 bytes
        1 Dir(s)  10,564,276 bytes free C:\ > notepad newfile.txt C:\ reviewcommand\standardhistory  ~ 214
C:\ reviewcommand\sharedhistory    ~ 216
```

SHARED COMMAND HISTORY

BACKGROUND

Computer processes may be performed using command windows. For example, a user may enter commands in the command window for performing a process. It may be helpful to view a history of the commands for performing a process. In this regard, a user may view her command history in the command window. In some examples, computer processes may be performed by members of a team for a given project, for example. In this regard, the members of the team may need to communicate with each other regarding whether one or more commands have been executed for performing a process. Current techniques for communicating between team members when performing a process using command windows include verbal discussions between team members and/or copy and paste operations. These techniques for communicating amongst team members while performing/executing a process using command windows may lead to errors and are time consuming when troubleshooting and/or executing processes. In turn, current techniques for communicating amongst team members while performing/executing a process using command windows are inefficient and inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for providing a shared command history. In one aspect, a shared command history is enabled for performing at least one process using a command line interface. One or more commands entered in the command line interface may be sent to a shared storage location. One or more commands stored in the shared storage location and executed using at least another command line interface may be received. The shared command history may be displayed in the command line interface. In one example, the shared command history includes at least the one or more received commands.

In another aspect, an initial command may be received in a command line interface for enabling the shared command history. Subsequent to receiving the initial command, one or more commands entered in the command line interface may be sent to a shared storage location. A review command may be received in the command line interface for viewing the shared command history. The shared command history may be displayed in the command line interface. In one example, the shared command history includes at least one or more commands executed using a plurality of command line interfaces.

In yet another aspect, a command line interface may include a first command line through which to receive an initial command for enabling a shared command history. The command line interface may further include a second command line through which to receive a review command for viewing the shared command history. The command line interface may further include a shared command history window through which to, in response to receiving the review command for viewing the shared command history, display at least one or more commands executed using another command line interface.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Aspects of the disclosure are generally directed to providing a shared command history. For example, a shared command history may be generated and displayed within a command line interface while performing and/or executing a process using the command line interface. In one example, the shared command history may include commands entered and/or executed by members of a team, for example, using a plurality of command line interfaces. In this regard, each member of the team may view commands executed and/or entered by other team members in the shared command history within her command line interface. In turn, the present disclosure makes troubleshooting and/or executing/performing processes using command line interfaces among team members efficient and reliable.

As discussed above, current techniques for communicating between team members when performing a process using command windows include verbal discussions between team members and/or copy and paste operations. These techniques for communicating amongst team members while performing/executing a process using command windows may lead to errors and are time consuming when troubleshooting and/or executing processes. In turn, current techniques for communicating amongst team members while performing/executing a process using command windows are inefficient and inadequate.

Accordingly, aspects described herein include providing a shared command history. In one example, a shared command history is enabled for performing at least one process using a command line interface. In one case, the shared command history is enabled when an initial command is received in the command line interface. In this regard, a user may enable the shared command history by entering a command including a switch and/or parameter. Subsequent to entering the initial command for enabling the shared command history, one or more commands entered in the command line interface may be sent to a shared storage location. One or more commands entered in another command line interface (e.g., entered by a team member) may also be sent to the shared storage location. In this regard, one or more commands stored in the shared storage location and executed using at least another command line interface may be received. The shared command history may be displayed in the command line interface when a review command is entered in the command line interface. In one example, the shared command history includes at least the one or more received commands. For example, the one or more received commands may include the one or more commands entered in another command line interface by a team member. As such, commands executed and/or entered by other team members may be viewed in the shared command history. A technical effect that may be appreciated is that providing a shared command history may facilitate troubleshooting and/or executing/performing processes using command line interfaces among team members in a clear and understandable manner and on a functional surface. Another technical effect that may be appreciated is that by performing and/or executing processes using command line interfaces among team members in a faster and/or more efficient manner, processor load may be reduced, memory may be conserved, and network bandwidth usage may be reduced.

Figure 1:
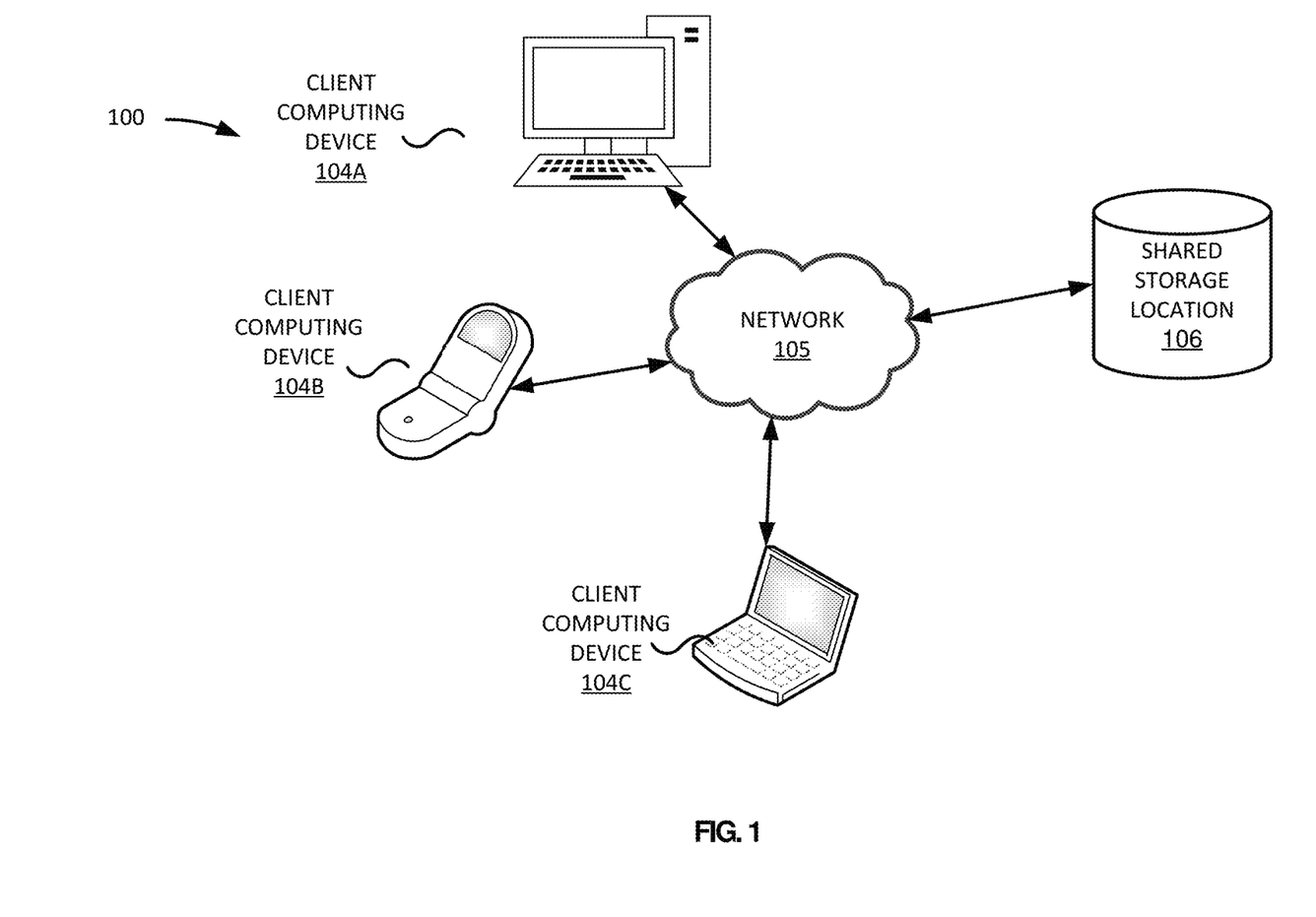
FIG. 1 illustrates an exemplary command history system for providing a shared command history, according to an example aspect.

Referring now to the drawings, in which like numerals represent like elements through the several figures, aspects of the present disclosure and the exemplary operating environment will be described. With reference to FIG. 1, one aspect of command history system 100 for providing a shared command history is illustrated. The command history system 100 may include client computing devices 104A-104C and a shared storage location 106. In aspects, the command history system 100 may be implemented on one or more of the client computing devices 104A-104C. In a basic configuration, the client computing devices 104A-104C are handheld computers having both input elements and output elements. The client computing devices 104A-104C may be any suitable computing device for implementing the command history system 100 for providing a shared command history. For example, the client computing devices 104A-104C may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing devices 104A-104C for implementing the command history system 100 for providing a shared command history may be utilized.

In aspects, the command history system 100 may be implemented on the shared storage location 106. The shared storage location 106 may provide data to and from the client computing devices 104A-104C through a network 105. In aspects, the command history system 100 may be implemented on more than one shared storage location 106, such as a plurality of shared storage locations 106. As discussed above, the shared storage location 106 may provide data to and from the client computing devices 104A-104C through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the command history system 100 may include the client computing devices 104A-104C and the shared storage location 106. The various components may be implemented using hardware, software, or a combination of hardware and software. In aspects, the client computing devices 104A-104C may include a user interface component. The user interface component may be configured to display a command line interface. In one example, a command line interface may be a user interface to the client computing devices 104A-104C operating system. In another example, the command line interface may be an application in which a user responds to visual prompt (e.g., a command window) by typing a command on a particular line of the command line interface. In yet another example, the command line interface may be a scripting utility such as cmdshell and powershell. In yet another example, the command line interface may be an interface to a database such as a SQL server. In this regard, a user may perform and/or execute a process using the command line interface by entering, typing, and/or executing commands in the command line interface. In this regard, the commands discussed herein refer to commands for performing and/or executing a process. For example, a process may require ten commands for performing the process. In another example, a process may require five commands for performing the process. In yet another example, a process may require twenty command for performing the process. This list is exemplary only and should not be considered limiting. Any number of commands may be required for performing a process and/or a plurality of processes. In one example, the process performed and/or executed using the command line interface includes an administrative task. An administrative task may include a task such as reformatting a disk drive, connecting a machine to a network, performing an upgrade to a system and/or software, and the like.

In other aspects, the user interface component and/or the command line interface may be configured to display a shared command history in the command line interface. The shared command history may be a window including one or more commands. In one example, the one or more commands included in the shared command history window may include commands executed using a plurality of command line interfaces. For example, each command executed in a command line interface of each of client computing device 104A, client computing device 104B, and client computing device 104C may be sent to the shared storage location 106. In one example, commands executed in a command line interface of each of and/or any of client computing device 104A, client computing device 104B, and client computing device 104C may be sent to the shared storage location 106 when the shared command history is enabled. In one case, the shared command history is enabled when an initial command is entered and received in the command line interface. As such, in one example, when the initial command is received in the command line interface of the client computing device 104A, subsequent commands entered in the command line interface of the client computing device 104A may be sent to the shared storage location 106. In another example, when the initial command is received in the command line interface of the client computing device 104B, subsequent commands entered in the command line interface of the client computing device 104B may be sent to the shared storage location 106. In yet another example, when the initial command is received in the command line interface of the client computing device 104C, subsequent commands entered in the command line interface of the client computing device 104C may be sent to the shared storage location 106.

In aspects, the initial command includes at least one of a switch and a parameter. For example, a user may enter a start command to start a process. In one example, the user may enter a switch with the start command such as start/teamcommand to enable the shared command history. In this regard, any commands entered in the command line interface subsequent to entering start/teamcommand may be sent to the shared storage location 106. While a specific example is described relative to a switch, it is appreciated that any switch and/or parameter may be used to enable the shared command history.

In examples, the shared command history may be displayed in the command line interface when a review command is received in the command line interface. The review command may include any command defined for displaying the shared command history such as any keyboard input. In this regard, when a review command is received in the command line interface of the client computing device 104A, the shared command history may be displayed in the command line interface of the client computing device 104A. In one example, the shared command history may include one or more commands received from the shared storage location 106. In this regard, the one or more received commands may include one or more commands executed using at least another command line interface. For example, the shared command history may include the commands entered in the command line interface of the client computing device 104B and the commands entered in the command line interface of the client computing device 104C (e.g., subsequent to enabling the shared command history). In another example, the one or more received commands may include one or more commands executed using a plurality of command line interfaces. For example, the shared command history may include the commands entered in the command line interface of the client computing device 104A, the commands entered in the command line interface of the client computing device 104B, and the commands entered in the command line interface of the client computing device 104C (e.g., subsequent to enabling the shared command history).

In aspects, the one or more commands for performing and/or executing a process using the command line interface may be stored in the shared storage location 106 based on a category. For example, the one or more commands may be stored in the shared storage location 106 based on a team working together on a particular project or task, for example. In this example, the commands of the members of a team may be stored in the shared storage location 106 based on the team. In this regard, when a user requests the shared command history (e.g., by entering/typing the review command in the command line interface), the one or more commands displayed in the shared command history may include the commands entered and/or executed by the team members. As such, in an example where ten commands are required to perform and/or execute a process, the shared command history may indicate which commands of the ten commands have already been executed by team members.

In another example, the one or more commands may be stored in the shared storage location 106 based on a customer. In this example, the commands executed for a process may be stored in the shared storage location 106 based on a customer. In this regard, when a user requests the shared command history (e.g., by entering/typing the review command in the command line interface), the one or more commands displayed in the shared command history may include the commands entered and/or executed for a particular customer. As such, in an example where one or more processes are associated with a customer, the shared command history may indicate which commands have been executed for each process associated with the customer.

In another example, the one or more commands may be stored in the shared storage location 106 based on a project. In this example, the commands executed for a process may be stored in the shared storage location 106 based on a project. In this regard, when a user requests the shared command history (e.g., by entering/typing the review command in the command line interface), the one or more commands displayed in the shared command history may include the commands entered and/or executed for a project. In one example, the project may be the process that is being performed. In this regard, the one or more commands displayed in the shared command history may include the commands entered and/or executed for a particular process. In another example, a project may include more than one process. In this example, the shared command history may indicate which commands have been executed for each process associated with the project.

In another example, the one or more commands may be stored in the shared storage location 106 based on any combination of a team, a customer, and a project. In this example, the commands executed for a process may be stored in the shared storage location 106 based on any combination of a team, a customer, and a project. In this regard, when a user requests the shared command history (e.g., by entering/typing the review command in the command line interface), the one or more commands displayed in the shared command history may include the commands entered and/or executed for any combination of a team, a customer, and a project.

In another example, the command line interface may display a standard command history window and/or the shared command history window. In some cases, the one or more commands entered and/or executed in the command line interface may be sent to a standard storage location. In other cases, the one or more commands entered and/or executed in the command line interface may be sent to both the standard storage location and the shared storage location 106. In this regard, a user may request to see her own command history and/or the shared command history. In one example, a user's own command history may be displayed in the standard command history window and the shared command history may be displayed in the shared command history window. In another example, a user's own command history and the shared command history may be displayed in the shared command history window.

In one example, the user interface component 110 may be a touchable user interface that is capable of receiving input via contact with a screen of the client computing devices 104A-104C, thereby functioning as both an input device and an output device. For example, content may be displayed, or output, on the screen of the client computing devices 104A-104C and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing devices 104A-104C, thereby functioning as both an input device and an output device. For example, content may be displayed, or output, on the screen of the client computing devices 104A-104C and input may be received by contacting the screen using a cursor, for example. In this regard, contact may include, for example, placing a cursor on the non-touchable user interface using a device such as a mouse.

In some aspects, the client computing devices 104A-104C may obtain the one or more commands from one or more sources. For example, the client computing devices 104A-104C may obtain the one or more commands from the shared storage location 106. The shared storage location 106 may include at least one of a file share, database, cloud service and local storage. In this regard, the shared storage location 106 may be configured to store, manage, and access data and/or information associated with the command history system 100. For example, the shared storage location 106 may store one or more commands entered or executed in command line interfaces for performing one or more processes. In one example, when the shared storage location 106 is local storage, the shared storage location 106 may be part of and/or located at the client computing devices 104A-104C. In another example, the shared storage location 106 may be a separate component and/or may be located separate from the client computing devices 104A-104C such as at a server computing device. It is appreciated that although one shared storage location 106 is illustrated in FIG. 1, the command history system 100 may include a plurality of shared storage locations 106.

Figure 2A:
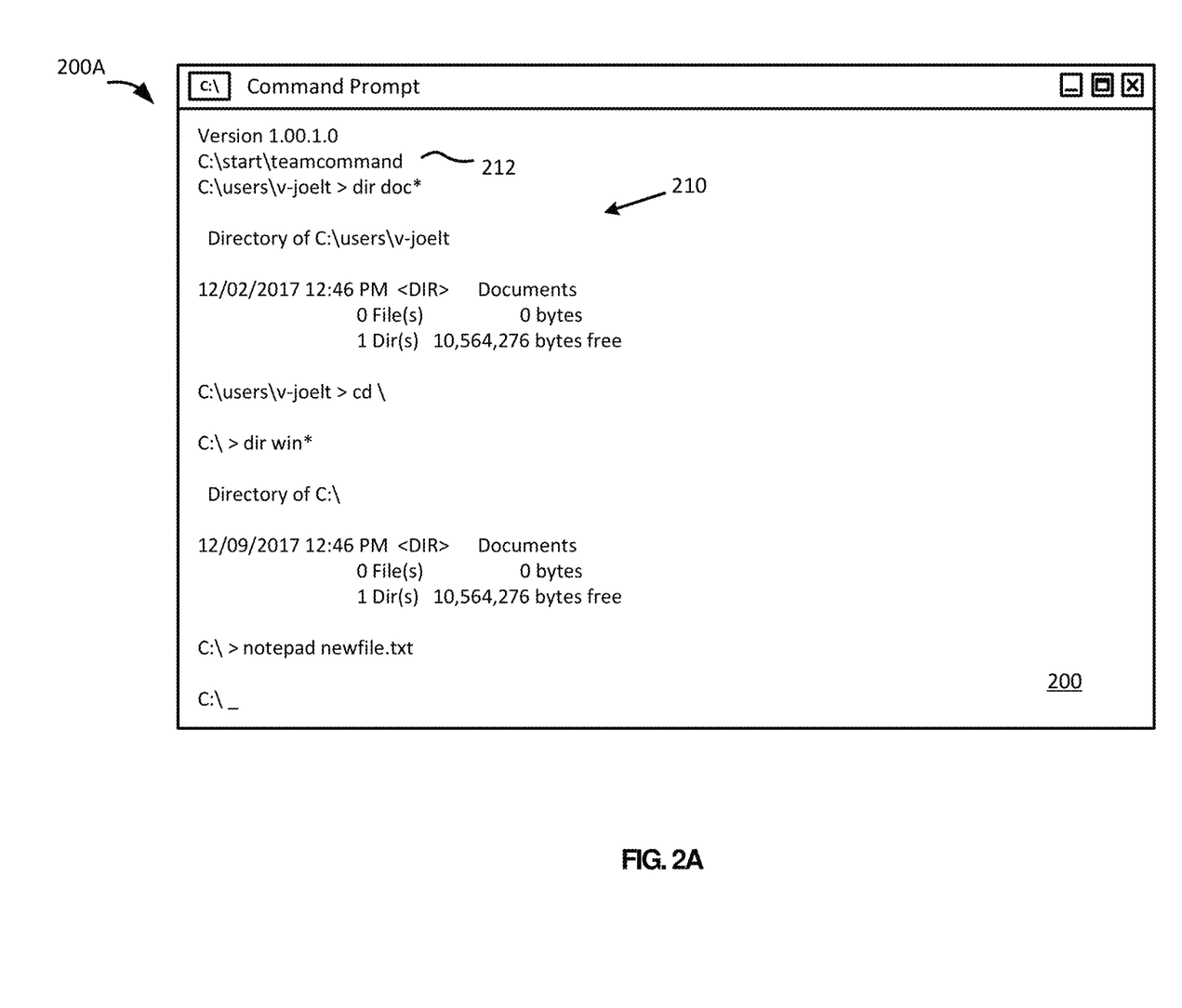
FIG. 2A illustrates one view in a progression of views a command line interface, according to an example aspect.

Referring now to FIG. 2A, one view 200A in a progression of views of a command line interface 200 displayed on a user interface of at least one of the client computing devices 104A-104C, such as a desktop computer, tablet computer or a mobile phone, for example, is shown. In one example, a command line interface may include a user interface to the client computing devices 104A-104C operating systems, an application in which a user responds to visual prompt (e.g., a command window) by typing a command on a particular line of the command line interface, a scripting utility such as cmdshell and powershell, and an interface to a database such as a SQL server. In this regard, a user may perform and/or execute a process using the command line interface 200 by entering, typing, and/or executing commands in the command line interface.

As illustrated, the exemplary view 200A of the command line interface 200 includes one or more commands 210. In particular, the one or more commands 210 include an initial command 212. The initial command 212 includes switch, start/teamcommand. In this regard, the one or more commands 210 entered in the command line interface 200 subsequent to the initial command 212 are sent to the shared storage location 106. As illustrated in FIG. 2A, the one or more commands 210 entered in the command line interface 200 subsequent to the initial command 212 include dir doc*, cd\, dir win*, and notepad newfile.txt. As such, these commands are sent to the shared storage location 106. The one or more commands 210 may be sent to the standard storage location, as discussed herein. In one example, the standard storage location is a local store.

Figure 2B:
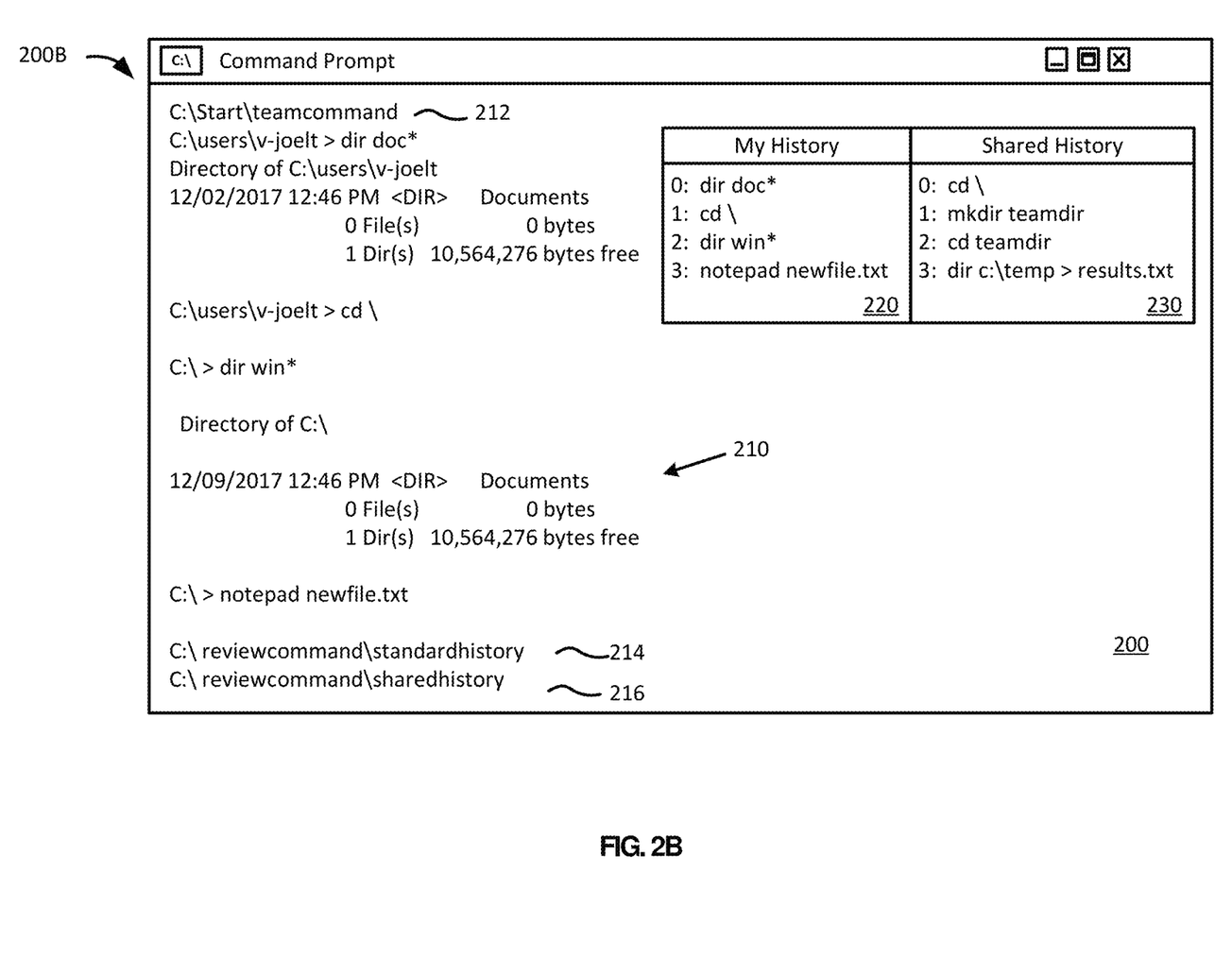
FIG. 2B illustrates another view in a progression of views of the command line interface of FIG. 2A, according to an example aspect.

Referring now to FIG. 2B, another view 200B in a progression of views of the command line interface 200 displayed on a user interface of at least one of the client computing devices 104A-104C, such as a desktop computer, tablet computer or a mobile phone, for example, is shown. As illustrated, the exemplary view 200B of the command line interface 200 includes the one or more commands 210, a standard command history window 220, and a shared command history window 230. In particular, the one or more commands 210 include the initial command 212 and review commands 214 and 216. The review command 214 is a review command for displaying the standard command history window 220. The review command 216 is a review command for displaying the shared command history window 230. In this regard, when a user enters the review commands 214 and 216 in the command line interface 200, the standard command history window 220 and the shared command history window 230 are displayed in the command line interface 200. While the review command 214 is illustrated as reviewcommand\standardhistory and the review command 216 is illustrated as reviewcommand\sharedhistory, these are exemplary only. It is appreciated that the review commands 214 and 214 may include any parameter such as any keyboard input, any text, and the like.

As illustrated in FIG. 2B, the standard command history window 220 includes the one or more commands 210 (e.g., dir doc*, cd\, dir win*, and notepad newfile.txt) described relative to FIG. 2A. As such, the standard command history window 220 includes the command history of a user of the command line interface 200. In one example, the one or more commands 210 displayed in the standard command history window 220 are received from a standard storage location. As illustrated in FIG. 2B, the shared command history window 230 includes one or more commands that are different from the one or more commands 210 displayed in the standard command history window 220. The one or more commands included in the shared command history window 230 are cd\, mkdir teamdir, cd teamdir, and dir c:\temp>results.text. In one example, the one or more commands displayed in the shared command history window 230 are received from the shared storage location 106. In this regard, the one or more commands displayed in the shared command history window 230 are commands executed in another command line interface (e.g., a command line interface other than the command line interface 200), which will be described below relative to FIG. 3.

As illustrated in FIG. 2B, the command line interface 200 includes both a user's own command history and a shared command history (e.g., commands that have been executed by other team members, for a project, for a customer). In this regard, a user of the command line interface 200 may quickly see the commands that have already been executed for performing a given process. In other examples, the command history of a user of the command line interface 200 (e.g., the one or more commands 210) may be displayed in the shared command history window 230 (not illustrated). In this example, the user's own command history is displayed with the shared command history (e.g., commands executed by team members using another command line interface). Displaying both the user's command history and the shared command history in the same window may facilitate easy access to all the commands that have already been executed for a given project.

Figure 3:
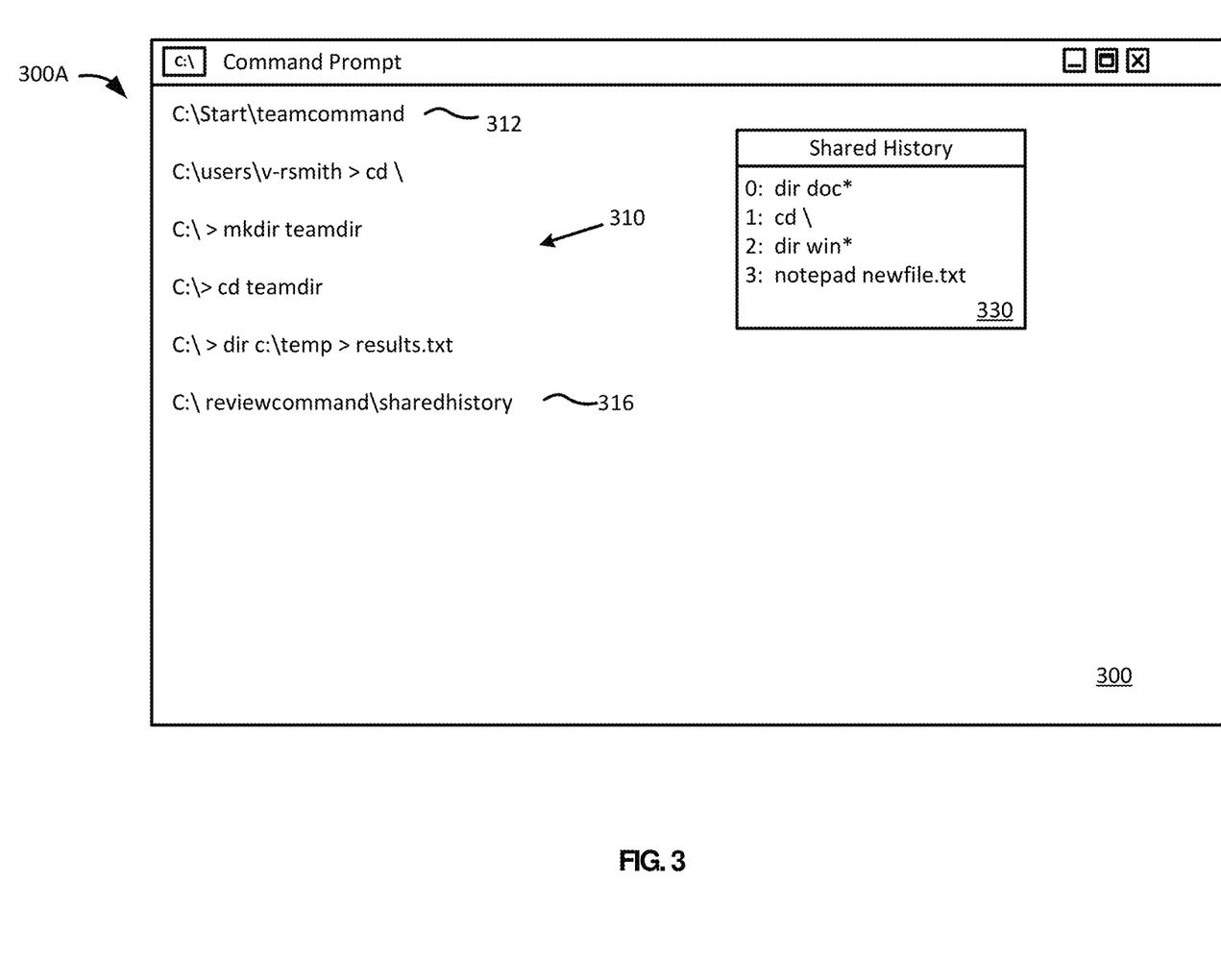
FIG. 3 illustrates one view of a command line interface, according to an example aspect.

Referring now to FIG. 3, one view 300A of a command line interface 300 displayed on a user interface of at least one of the client computing devices 104A-104C, such as a desktop computer, tablet computer or a mobile phone, for example, is shown. In one example, a command line interface may include a user interface to the client computing devices 104A-104C operating systems, an application in which a user responds to visual prompt (e.g., a command window) by typing a command on a particular line of the command line interface, a scripting utility such as cmdshell and powershell, and an interface to a database such as a SQL server. In this regard, a user may perform and/or execute a process using the command line interface 300 by entering, typing, and/or executing commands in the command line interface.

As illustrated, the exemplary view 300A of the command line interface 300 includes one or more commands 310 and a shared command history window 330. In particular, the one or more commands 310 include an initial command 312 and a review command 316. The initial command 312 includes switch, start/teamcommand. In this regard, the one or more commands 310 entered in the command line interface 300 subsequent to the initial command 312 are sent to the shared storage location 106. As illustrated in FIG. 3, the one or more commands 310 entered in the command line interface 300 subsequent to the initial command 312 include cd\, mkdir teamdir, cd teamdir, and dir c:\temp>results.text. As such, these commands are sent to the shared storage location 106. The one or more commands 310 are the same commands displayed in the shared command history window 230 described relative to FIG. 2B. As such, as described relative to FIG. 2B, when the user of the command line interface 200 enters the review command 216 in the command line interface 200, the one or more commands 310 are received from the shared storage location 106 and displayed in the shared command history window 230. In one example, the one or more commands 310 may be sent to the standard storage location, as discussed herein. In one example, the standard storage location is a local store.

As illustrated in FIG. 3, the review command 316 is a review command for displaying the shared command history window 330. In this regard, when a user enters the review command 316 in the command line interface 300, the shared command history window 330 is displayed in the command line interface 300. While the review command 316 is illustrated as reviewcommand\sharedhistory, this are exemplary only. It is appreciated that the review command 316 may include any parameter such as any keyboard input, any text, and the like.

As illustrated in FIG. 3, the shared command history window 330 includes the commands dir doc*, cd\, dir win*, and notepad newfile.txt. The commands displayed in the shared command history window 330 are the same commands as the one or more commands 210 (e.g., dir doc*, cd\, dir win*, and notepad newfile.txt) described relative to FIGS. 2A and 2B. As such, when the user of the command line interface 300 enters the review command 316 in the command line interface 300, the one or more commands 210 are received from the shared storage location 106 and displayed in the shared command history window 330. In this regard, the one or more commands displayed in the shared command history window 330 are commands executed in another command line interface (e.g., the command line interface 200 described relative to FIGS. 2A and 2B).

It is appreciated that while FIGS. 2A, 2B and 3 illustrate command line interfaces 200, 300, initial commands 212, 312, review commands 214, 216, 316, one or more commands 210, 310, standard command history window 220, and shared command history windows 230, 330, the discussion of the command line interfaces 200, 300, initial commands 212, 312, review commands 214, 216, 316, one or more commands 210, 310, standard command history window 220, and shared command history windows 230, 330 is exemplary only and should not be considered as limiting. Any suitable number and/or type of command line interfaces, initial commands, review commands, one or more commands for performing a process using a command line interface, standard command history windows, and shared command history windows may be utilized in conjunction with the present disclosure.

Figure 4:
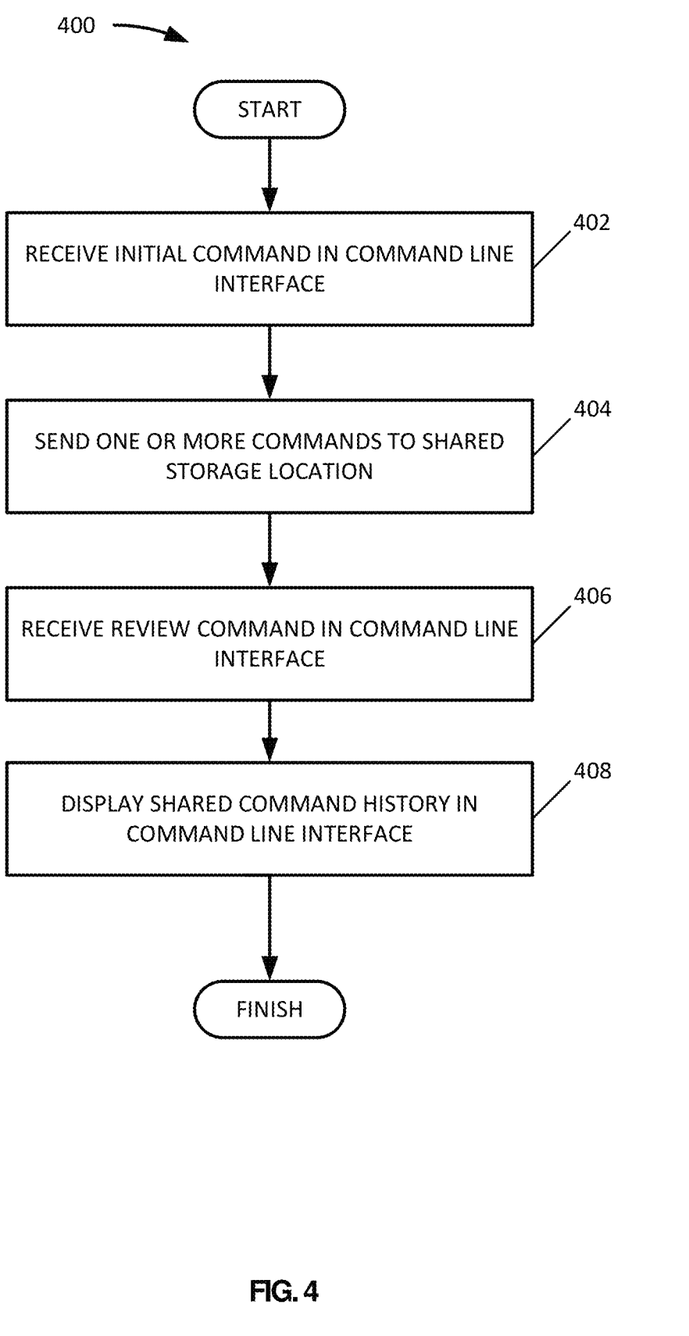
FIG. 4 illustrates an exemplary method for providing a shared command history, according to an example aspect.

Referring now to FIG. 4, an exemplary method 400 for providing a shared command history, according to an example aspect is shown. Method 400 may be implemented on a computing device or a similar electronic device capable of executing instructions through at least one processor. Method 400 may begin at operation 402, where an initial command is received in a command line interface for enabling a shared command history. In one example, the initial command includes at least one of a switch and a parameter. For example, a user may enter a start command to start a process. In one example, the user may enter a switch with the start command such as start/teamcommand to enable the shared command history. In one example, the command line interface may be an application in which a user responds to visual prompt (e.g., a command window) by typing a command on a particular line of the command line interface. In yet another example, the command line interface may be a scripting utility such as cmdshell and powershell. In yet another example, the command line interface may be an interface to a database such as a SQL server.

Subsequent to receiving the initial command in the command line interface for enabling the shared command history, flow proceeds to operation 404 where one or more commands entered in the command line interface are sent to a shared storage location. In one example, the shared storage location includes at least one of a file share, database, cloud service and local storage. In some cases, the one or more commands entered in the command line interface subsequent to receiving the initial command in the command line interface may be sent to a standard storage location. In other cases, the one or more commands entered subsequent to receiving the initial command in the command line interface may be sent to both the standard storage location and the shared storage location. In one example, the one or more commands stored in the shared storage location include commands sent from the plurality of command line interfaces.

At operation 406, a review command is received in the command line interface for viewing the shared command history. In one example, the review command may include any command defined for viewing the shared command history such as a keyboard input, text, and the like. In response to receiving the review command, one or more commands stored in the shared storage location and executed using at least another command line interface may be received for display in the shared command history. In one example, the shared command history may include a shared command history window through which to, in response to receiving the review command in the command line interface for viewing the shared command history, display at least one or more commands executed using another command line interface and/or a plurality of command line interfaces.

When the review command is received in the command line interface for viewing the shared command history, flow proceeds to operation 408 where the shared command history is displayed in the command line interface. In one example, the shared command history includes at least one or more commands executed using a plurality of command line interfaces. In one example, the plurality of command line interfaces includes at least the command line interface (e.g., in which the review command is received) and another command line interface. In another example, the plurality of command line interfaces includes at least two command line interfaces other than the command line interface. In one example, the command line interface is configured to perform at least one process using one or more commands. In some cases, the at least one process is an administrative task. In one example, the shared command history is displayed in an upper right portion of the command line interface. In another example, the shared command history is displayed in a middle portion of the command line interface. In another example, the shared command history is displayed in a lower right portion of the command line interface. In one example, the shared command history is displayed as a shared command history window in the command line interface.

Figure 5:
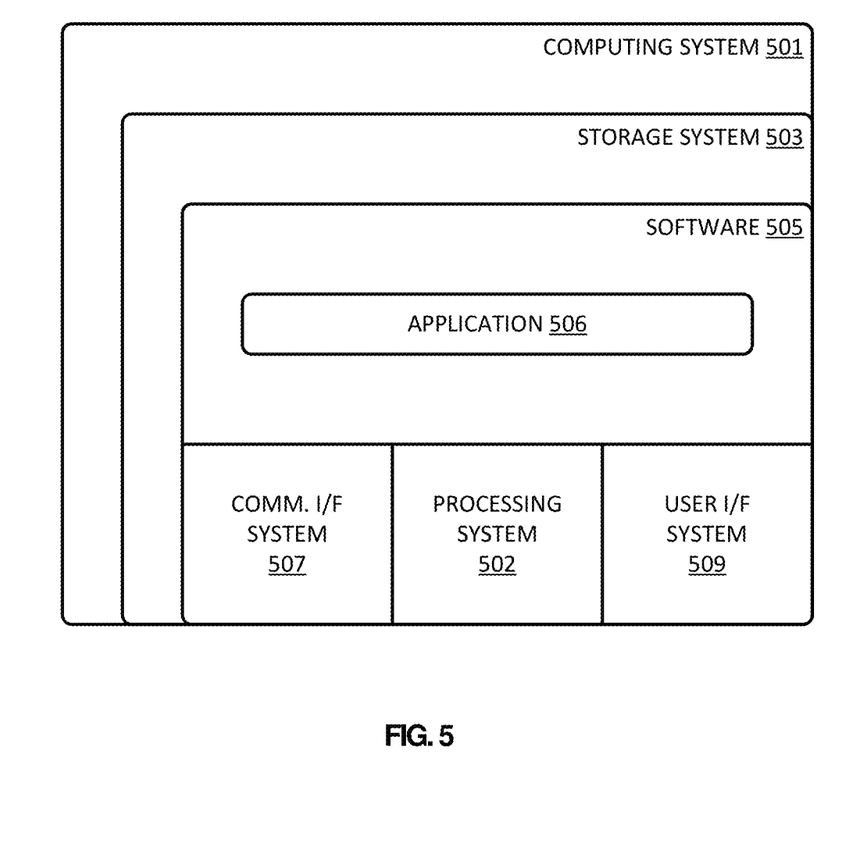
FIG. 5 illustrates a computing system suitable for implementing the enhanced shared command history technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including command line interfaces described herein. When executed by processing system 502 to enhance command history, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced command history systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced command history systems. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: enable a shared command history for performing at least one process using a command line interface; send one or more commands entered in the command line interface to a shared storage location; receive one or more commands stored in the shared storage location and executed using at least another command line interface; and display the shared command history in the command line interface, wherein the shared command history includes at least the one or more received commands. In further examples, the shared command history is enabled when an initial command is received in the command line interface. In further examples, the initial command includes at least one of a switch and a parameter. In further examples, the shared command history is displayed in the command line interface when a review command is received in the command line interface. In further examples, the one or more commands stored in the shared storage location include commands sent from at least the another command line interface. In further examples, wherein the one or more commands included in the shared command history include shared commands based on a team. In further examples, the one or more commands included in the shared command history include shared commands based on a project. In further examples, the one or more commands included in the shared command history include shared commands based on a customer. In further examples, the shared storage location includes at least one of a file share, database, cloud service and local storage.

Further aspects disclosed herein provide an exemplary computer-implemented method for providing a shared command history, the method comprising: receiving an initial command in a command line interface for enabling the shared command history; subsequent to receiving the initial command, sending one or more commands entered in the command line interface to a shared storage location; receiving a review command in the command line interface for viewing the shared command history; and displaying the shared command history in the command line interface, wherein the shared command history includes at least one or more commands executed using a plurality of command line interfaces. In further examples, the plurality of command line interfaces includes at least the command line interface and another command line interface. In further examples, plurality of command line interfaces includes at least two command line interfaces other than the command line interface. In further examples, the command line interface is configured to perform at least one process using one or more commands. In further examples, the at least one process is an administrative task. In further examples, the computer-implemented method further comprises sending the one or more commands to a standard history location. In further examples, the computer-implemented method further comprises receiving one or more commands stored in the shared storage location for display in the shared command history. In further examples, the one or more commands stored in the shared storage location include commands sent from the plurality of command line interfaces.

Additional aspects disclosed herein include a computing apparatus comprising: one or more computer readable storage media; and a command line interface embodied at least in part in program instructions stored on the one or more computer readable storage media and comprising: a first command line through which to receive an initial command for enabling a shared command history; a second command line through which to receive a review command for viewing the shared command history; and a shared command history window through which to, in response to receiving the review command for viewing the shared command history, display at least one or more commands executed using another command line interface. In further examples, the command line interface is a scripting utility. In further examples, the one or more commands are stored in a shared storage location.

Techniques for providing shared command histories are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of enhanced command history systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more computer readable storage media; and
   program instructions stored on the one or more computer readable storage media that, when executed by at least one processor, cause the at least one processor to at least:
   enable a shared command history for performing at least one process using a command line interface;

send one or more first commands entered in the command line interface to a shared storage location;

receive one or more second commands stored in the shared storage location and executed using at least another command line interface; and display the shared command history in the command line interface, wherein the shared command history includes at least the one or more second commands, and where at least one of the one or more first commands is different than at least one of the one or more second commands.

2. The system of claim 1, wherein the shared command history is enabled when an initial command is received in the command line interface.

3. The system of claim 2, wherein the initial command includes at least one of a switch and a parameter.

4. The system of claim 1, wherein the shared command history is displayed in the command line interface when a review command is received in the command line interface.

5. The system of claim 1, wherein the one or more second commands stored in the shared storage location include commands sent from at least the another command line interface.

6. The system of claim 1, wherein the one or more second commands included in the shared command history include shared commands based on a team.

7. The system of claim 1, wherein the one or more second commands included in the shared command history include shared commands based on a project.

8. The system of claim 1, wherein the one or more second commands included in the shared command history include shared commands based on a customer.

9. The system of claim 1, wherein the shared storage location includes at least one of a file share, database, cloud service and local storage.

10. A computer-implemented method for providing a shared command history, the method comprising:

receiving an initial command in a command line interface that activates the shared command history;

subsequent to receiving the initial command, sending one or more commands entered in the command line interface to a shared storage location;

receiving a review command in a command line of the command line interface that when executed enables viewing of the shared command history; and displaying the shared command history in the command line interface, wherein the shared command history includes at least one or more commands executed using a plurality of command line interfaces.

11. The computer-implemented method of claim 10, wherein the plurality of command line interfaces includes at least the command line interface and another command line interface.

12. The computer-implemented method of claim 10, wherein the plurality of command line interfaces includes at least two command line interfaces other than the command line interface.

13. The computer-implemented method of claim 10, wherein the command line interface is configured to perform at least one process using one or more commands.

14. The computer-implemented method of claim 13, wherein the at least one process is an administrative task.

15. The computer-implemented method of claim 10 further comprising sending the one or more commands to a standard history location.

16. The computer-implemented method of claim 10, further comprising receiving one or more commands stored in the shared storage location for display in the shared command history.

17. The computer-implemented method of claim 16, wherein the one or more commands stored in the shared storage location include commands sent from the plurality of command line interfaces.

18. A computing apparatus comprising:

one or more computer readable storage media; and a command line interface embodied at least in part in program instructions stored on the one or more computer readable storage media and comprising:

a first command line indicated by a first visual prompt through which to receive an initial command for enabling a shared command history;

a second command line indicated by a second visual prompt through which to receive a review command for viewing the shared command history; and a shared command history window through which to, in response to receiving the review command for viewing the shared command history, display at least one or more commands executed using another command line interface.

19. The computing apparatus of claim 18, wherein the command line interface is a scripting utility.

20. The computing apparatus of claim 18, wherein the one or more commands are stored in a shared storage location.

* * * * *